United States Patent [19]

Miyaguchi et al.

[11] Patent Number: 5,319,494
[45] Date of Patent: Jun. 7, 1994

[54] LIGHT WAVEGUIDE TYPE POLARIZED LIGHT BEAM SPLITTER

[75] Inventors: Satoshi Miyaguchi; Atoshi Onoe, both of Saitama, Japan

[73] Assignee: Pioneer Electronic Corporation, Tokyo, Japan

[21] Appl. No.: 967,528

[22] Filed: Oct. 28, 1992

Related U.S. Application Data

[63] Continuation of Ser. No. 708,339, May 31, 1991, abandoned.

[30] Foreign Application Priority Data

Nov. 7, 1990 [JP] Japan ................................. 2-301649

[51] Int. Cl.$^5$ ........................ G02B 1/08; G02B 5/30; G02B 27/28
[52] U.S. Cl. ........................ 359/487; 359/488; 359/495; 359/496; 385/11
[58] Field of Search ............... 359/487, 488, 494, 496, 359/500, 495; 385/8, 11, 14

[56] References Cited

U.S. PATENT DOCUMENTS

| | | | |
|---|---|---|---|
| 3,401,590 | 9/1968 | Massey | 359/496 |
| 3,563,633 | 2/1971 | Mauer | 359/496 |
| 4,691,984 | 9/1987 | Thaniyavarn | 385/8 |
| 4,725,774 | 2/1988 | Davis et al. | 385/14 |
| 4,778,234 | 10/1988 | Papuchon et al. | 385/11 |
| 4,991,937 | 2/1991 | Urino | 359/494 |
| 5,029,988 | 7/1991 | Urino | 359/494 |
| 5,070,488 | 12/1991 | Fukushima et al. | 359/571 |
| 5,078,482 | 1/1992 | Feldman et al. | 359/496 |

FOREIGN PATENT DOCUMENTS

53-111743 9/1978 Japan.
57-167006 10/1982 Japan.

OTHER PUBLICATIONS

De Micheli et al, "Fabrication and Characterization of Titanium Indiffused Proton Exchange (Tipe) Waveguides in Lithium Niobate," *Optics Communications*, vol. 42, No. 2, 15 Jun. 1982, pp. 101 to 103.

N. Goto and G. L. Yip, "A TE-TM Mode Splitter in LiNbO$_3$ by Proton Exchange and Ti Diffusion," *Journal of Lightwave Technology*, vol. 7, No. 10, Oct. 1989, pp. 1567-1574.

*Primary Examiner*—Martin Lerner
*Attorney, Agent, or Firm*—Sughrue, Mion, Zinn, Macpeak & Seas

[57] ABSTRACT

A polarized beam splitter is provided for transmitting a beam of linearly polarized light vibrating in a predetermined plane. A titanium diffused layer is developed on the lithium niobate substrate and then, a portion of the same is treated by proton exchange thus forming a proton exchanged region. The boundary surface between the titanium diffused and proton exchanged regions is used as a polarizing plane allowing an incoming polarized light vibrating in the predetermined plane to pass through and a polarized light vibrating at a right angle to the plane to reflect.

2 Claims, 3 Drawing Sheets

(a)

(b)

(c)

(d)

(e)

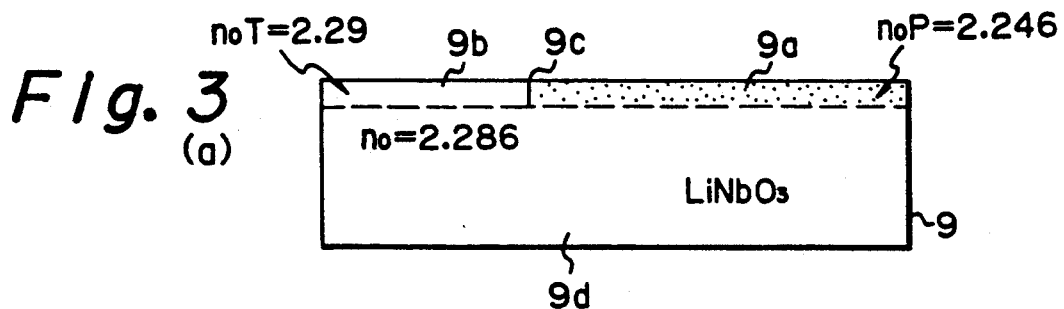
Fig. 3 (a)
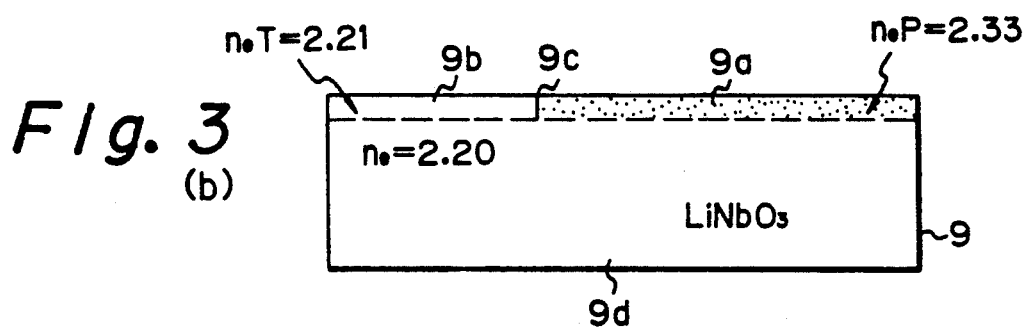
Fig. 3 (b)
Fig. 4
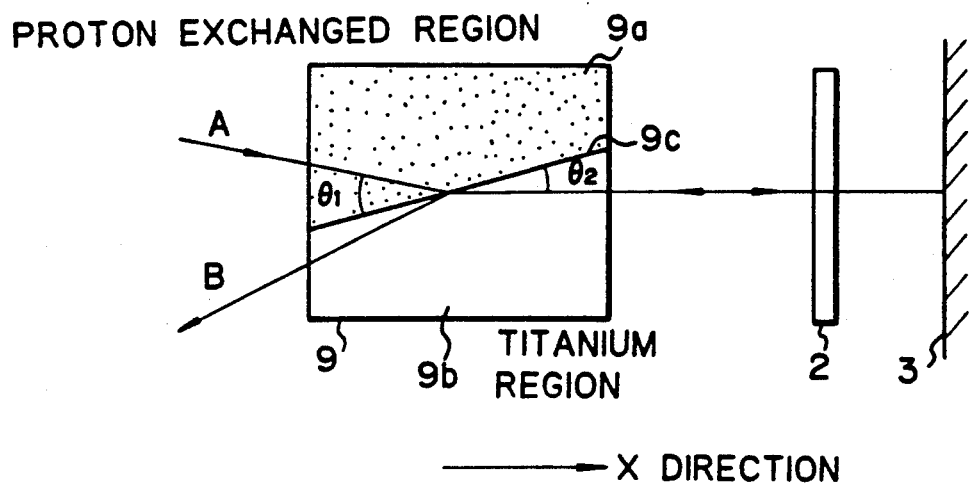

LIGHT WAVEGUIDE TYPE POLARIZED LIGHT BEAM SPLITTER

This is a continuation of application Ser. No. 07/708,339 filed May 31, 1991 now abandoned.

BACKGROUND OF THE INVENTION

1. Field of the Invention

The present invention relates to a polarized beam splitter for transmitting or reflecting a beam of incoming polarized light according to its plane of polarization.

2. Description of Background Information

Polarized beam splitters for transmitting one of two linearly polarized light beam, the polarization planes of which are at a right angle to each other and for reflecting the other are widely used as an optical splitter or a light propagation shifter disposed in optical application apparatuses. Such known polarized beam splitters are generally made of calcite or quartz, e.g. Wollaston prism, or may be formed by coating a prism with a dielectric material.

FIG. 1 illustrates the arrangement of a known polarized beam splitter using prisms. As shown, a polarized beam splitter 1 consists mainly of two right-angle prisms 1a and 1b with their base sides coated with layers of dielectric material and cemented to each other with an adhesive. The prism 1 is arranged so that the cemented area 1c (referred to as a dielectric layer hereinafter) allows a linearly polarized light vibrating vertically (referred to as an S polarized light) to pass through and a linearly polarized light vibrating horizontally (referred to as a P polarized light) to reflect. Also, the dielectric layer 1c is arranged at 45° to the direction of incident of an incoming light A.

A beam of S polarized light A is introduced to pass through the prism 1 and through a quarter wave plate 2 prior to reflecting on a mirror 3. A reflected beam from the mirror 3 passes again through the quarter wave plate 2 and returns to the prism 1. The quarter wave plate 2 has a thickness equal to ¼ the optical path length of a transmitting light, thus shifting the polarization of the linearly polarized light by 90° through two pass actions. Accordingly, the reflected beam becomes a P polarized-light which is reflected by the dielectric layer 1c and propagates at a right angle to the incident direction of the incoming or S polarized light A, as shown in FIG. 1.

The disadvantages of such a prior art polarized beam splitter are however that its production and the assembly and adjustment of its components are troublesome and not suited for automated manufacturing. Also, its three-dimensional construction in principle is hardly reducible in size and particularly, in thickness.

OBJECT AND SUMMARY OF THE INVENTION

It is an object of the present invention to provide a polarized beam splitter which requires no troublesome assembly work nor adjustment and has a two-dimensional construction for ease of downsizing.

A polarized beam splitter according to the present invention is provided with a first and a second region forming a boundary surface therebetween which allows a linearly polarized light beam oscillating in a predetermined plane to pass through the boundary surface and another linearly polarized light beam oscillating in one other plane than the predetermined plane to be reflected by the boundary surface. In particular, the first region is arranged in the form of a titanium diffused layer developed through diffusion of titanium into a lithium niobate substrate and the second region is arranged by treating a portion of the titanium diffused layer for proton exchange.

In the operation of the polarized beam splitter of the present invention, a linearly polarized light beam can pass through the boundary surface between the two regions (those two regions being a titanium diffused region developed by diffusing titanium into a layer of the lithium niobate substrate and a proton exchanged region arranged by treating a portion of the titanium diffused layer by a proton exchange process) and another linearly polarized light beam oscillating in a plane other than the predetermined plane can reflect on the boundary surface.

BRIEF DESCRIPTION OF THE DRAWINGS

FIG. 3 shows cross sectional views (a) and (b) of the polarized beam splitter illustrated in FIG. 2 (e); and FIG. 4 is a view showing the polarized beam splitter of an embodiment of the present invention.

DETAILED DESCRIPTION OF THE PREFERRED EMBODIMENT

One preferred embodiment of the present invention will be described in more detail referring to FIGS. 2 to 4.

Figure 1:
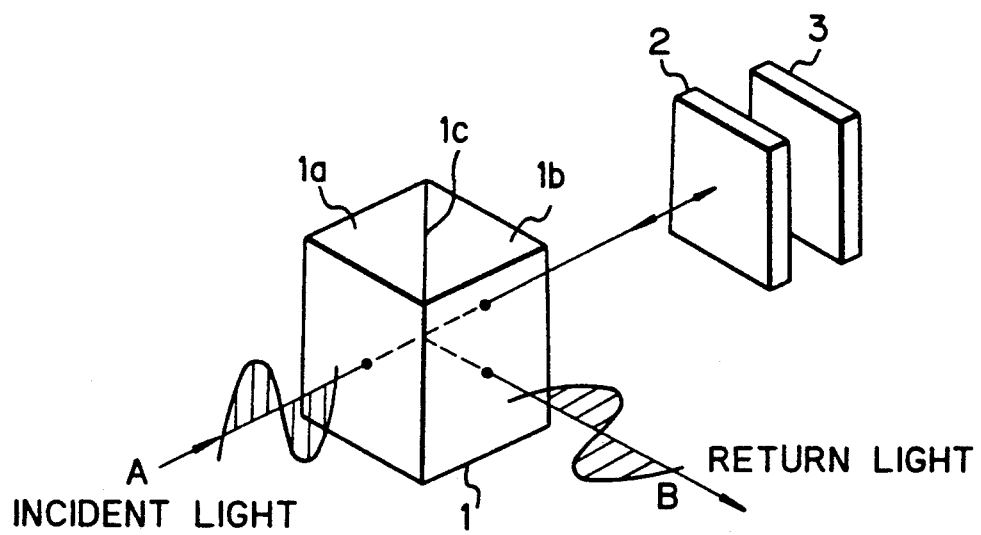
FIG. 1 is a schematic view showing the arrangement of a prior art polarized beam splitter.
Figure 2:
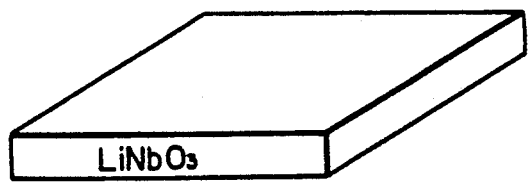
FIG. 2 shows views (a) through (e) illustrating a procedure of fabricating a polarized beam splitter of the present invention.
Figure 2:
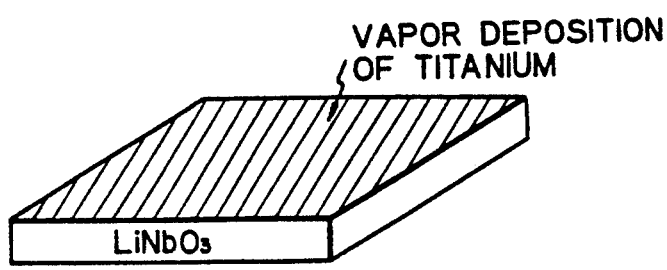
Figure 2:
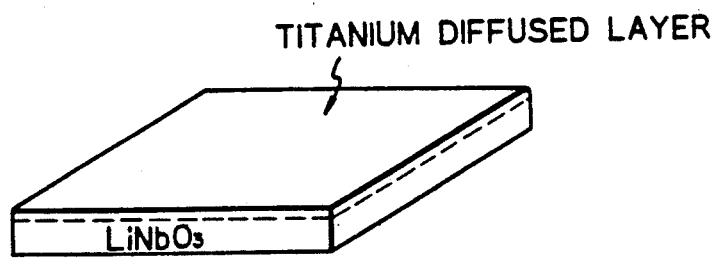
Figure 2:
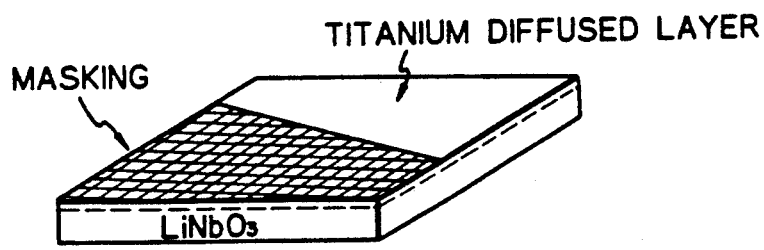
Figure 2:
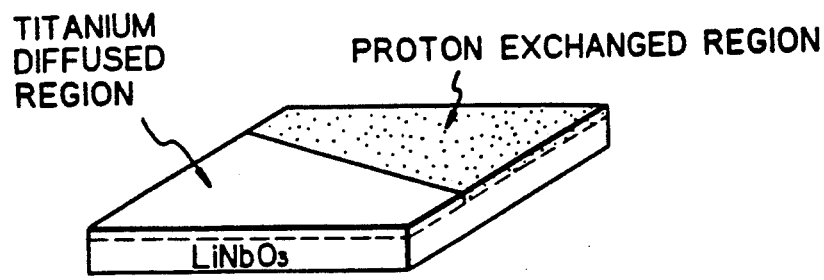

FIG. 2 illustrates in (a) through (e) the procedure for fabricating a polarized beam splitter according to the present invention. FIG. 2 (a) shows a Y-cut lithium niobate ($LiNbO_3$) substrate (referred to as a substrate hereinafter) capable of producing ferroelectricity. One side of the substrate is mirror polished so that it forms a polished surface across which a light beam's path extends. FIG. 2 (b) shows the polished surface of the substrate on which an amount of titanium is vapor deposited by sputtering or like process, thereby developing a thin titanium layer of about 200 angstroms in thickness. FIG. 2 (c) shows a structure in which a titanium diffused layer is developed through heating up the thin titanium layer to about 1000° C. for diffusion of titanium into the inside of the substrate.

Then, a region of the titanium diffused layer is masked on top with an acid-resisting metallic material, e.g. tantalum, as shown in FIG. 2 (d) and the remaining unmasked region is treated with a benzoic or pyrophosphoric acid for proton exchange. FIG. 2 (e) illustrates the substrate surface divided by a boundary surface into the existing titanium diffused region (referred to as a titanium region hereinafter) where the masking allowed no proton exchange and the newly developed region (referred to as a proton exchanged region) where the proton exchange was executed after titanium diffusion.

The titanium region, the proton exchanged region, and the substrate exhibit different refractive indices to a normal and an abnormal ray when the rays of light are propagated approximately along the X axis or on the X-Y plane. In the embodiment, the refractive indices, no and ne, of the titanium region are 2.29 to the normal ray and 2.21 to the abnormal ray. Similarly, the proton exchanged region exhibits 2.246 for no and 2.33 for ne. The substrate exhibits 2.286 for no and 2.20 for ne.

FIG. 3 shows, in (a) and (b), cross sectional views of a polarized beam splitter 9 produced by the procedure shown in FIG. 2 (a) to (e). As shown, the diffused layer of a substrate 9d is divided by a boundary surface 9c into a proton exchange region 9a and a titanium region 9b.

The polarized beam splitter 9 is more specifically illustrated in FIG. 4 as viewed from its diffused thin film side. Its substrate (not shown) is made of Y-cut lithium niobate for propagation in the X direction, as above described.

FIG. 4 shows an S polarized (TE mode) light beam split into two rays by the boundary surface.

More particularly, a beam A of incoming light enters the boundary surface 9c of the polarized beam splitter 9. The incident beam A is refracted at the boundary surface 9c to the X direction and transmitted through the titanium region 9b. The angle of a refracted beam to the boundary surface 9c is designated as $\theta_2$.

The refracted beam from the titanium region 9b passes through a quarter wave plate 2 where it is shifted from linearly to circularly polarized wave and then reflects on a mirror 3. The reflected beam passes again through the quarter wave plate 2 where its polarizing direction is shifted 90° from that of the original linearly polarized wave just after the titanium region 9b. More specifically, the reflected beam becomes a P polarized light which is returned to the titanium region 9b. As the return beam B is directed from a high refractive index side across the boundary surface 9c to a low refractive side, the angle $\theta_2$ should be determined for total reflection of the return beam B by:

$$0 < \theta_2 \leq \cos^{-1}(n_oP/n_oT)$$

The refractive indices of the proton exchange region 9a and the titanium region 9b to a normal ray are:
noP=2.246 and noT=2.29.
Also, the same to an abnormal ray are:
neP=2.33 and neT=2.21.
Hence, the total reflection angle $\theta_2$, that is, a refraction angle, is expressed as:

$$0 < \theta_2 \leq 11.1°$$

The angle $\theta_2$ is given by the boundary surface 9c and the X direction and represents a displacement angle of the boundary surface 9c to the light beam's path of both the refracted and return beams across the polarized beam splitter 9. Then, the incident angle $\theta_1$ is expressed as:

$$18.5° < \theta_1 \leq 21.5°$$

The value of 18.5 is obtained on condition that $\theta_2$ is 0.

Accordingly, by determining the incident angle and the displacement angle on the polarized beam splitter 9 to appropriate degrees, the incident beam A can be transmitted directly through and the return beam B can be directed by total reflection to a different direction from the propagation of the incident beam A.

Although a beam of light is propagated approximately along the X direction or on the X-Y plane of the Y-cut LiNbO₃ substrate in the embodiment, a Z-cut LiNbO₃ substrate will be employed with equal success in which a light beam is propagated on the X-Z plane. As a result, if the incident beam A shown in FIG. 4 is in TM mode, the outgoing beam B will be given in TE mode as a desired output of the polarized beam splitter.

As set forth above, the polarized beam splitter of the present invention has a titanium diffused layer developed on a lithium niobate substrate and a proton exchanged region is formed in an area thereof. In operation, a linearly polarized beam of light vibrating in a predetermined plane can transmit through the boundary surface between the titanium diffused area and the proton exchanged area and a linearly polarized beam vibrating in a plane other than the predetermined plane will be reflected on the boundary surface.

The polarized beam splitter has such an arrangement that the boundary surface is integrated with the substrate of thin type thus eliminating troublesome assembly and adjustment jobs. Also, the polarized beam splitter has a two-dimensional construction which can easily be reduced in the size.

Furthermore, a light propagation path is arranged integral with the polarized beam splitter on the same substrate, whereby an optical integrated circuit can be constructed easily.

What is claimed is:

1. A light waveguide type polarized light beam splitter comprising:
   a first region;
   a second region; and
   a boundary surface formed between said first region and said second region; wherein:
   said first region is a titanium diffused layer developed through diffusion of titanium into a lithium niobate substrate;
   said second region is a portion of the titanium diffused layer treated by a proton exchange process;
   said first region and said second region have differing refractive indices;
   said beam splitter is configured to pass an incident linearly polarized light beam,
   oscillating in a predetermined plane,
   propagating in a predetermined direction and
   entering the beam splitter via said second region, through said boundary surface, and is configured to reflect a return light beam,
   oscillating in a shifted plane of polarization,
   propagating in a return direction and
   entering the beam splitter via said first region, at said boundary surface;
   said boundary surface is inclined by an angle of $\theta_1$ with respect to the direction of propagation of the linearly polarized light, and is inclined by an angle of $\theta_2$ with respect to the direction of propagation of the return light beam; and
   the angle $\theta_2$ is determined to satisfy the condition of $$0° < \theta_2 \leq \cos^{-1}(n_{oP}/n_{oT})$$

wherein $n_{oT}$ represents a refractive index of the titanium diffused layer against ordinary rays, and $n_{oP}$ represents a refractive index of said second region treated by the proton exchange process against ordinary rays.

2. A light waveguide type polarized light beam splitter comprising:
   a first region;
   a second region; and
   a boundary surface formed between said first region and said second region; wherein:
   said first region is a titanium diffused layer developed through diffusion of titanium into a lithium niobate substrate;
   said second region is a portion of the titanium diffused layer treated by a proton exchange process;

said first region and said second region have differing refractive indices;

said beam splitter is configured to pass an incident linearly polarized light beam,
 oscillating in a predetermined plane,
 propagating in a predetermined direction and
 entering the beam splitter via said second region, through said boundary surface, and is configured to reflect a return light beam,
 oscillating in a shifted plane of polarization,
 propagating in a return direction and
 entering the beam splitter via said first region, at said boundary surface;

said boundary surface is inclined by an angle of $\theta_1$ with respect to the direction of propagation of the linearly polarized light, and is inclined by an angle of $\theta_2$ with respect to the direction of propagation of the return light beam, and a $\lambda/4$ plate and a reflection plane positioned outside the beam splitter are provided for shifting the plane of polarization and altering the direction of propagation of the passed linearly polarized light beam, for producing the return light beam.

* * * * *